(12) United States Patent
Jang et al.

(10) Patent No.: US 7,935,175 B2  
(45) Date of Patent: May 3, 2011

(54) APPARATUS FOR TRAPPING CARBON NANOTUBE AND SYSTEM AND METHOD FOR PRODUCING THE CARBON NANOTUBE

(75) Inventors: Suk-Won Jang, Yongin-shi (KR); Young-Chul Joung, Suwon-shi (KR)

(73) Assignee: Semes Co., Ltd., Chungcheongnam-do (KR)

( * ) Notice: Subject to any disclaimer, the term of this patent is extended or adjusted under 35 U.S.C. 154(b) by 584 days.

(21) Appl. No.: 11/889,230

(22) Filed: Aug. 10, 2007

(65) Prior Publication Data
US 2008/0233041 A1    Sep. 25, 2008

(30) Foreign Application Priority Data

Aug. 10, 2006  (KR) .................. 10-2006-0075678

(51) Int. Cl.
*B03C 1/32*  (2006.01)
(52) U.S. Cl. ............................................... 95/28; 96/2
(58) Field of Classification Search ........ 95/28; 96/1–3; 210/222, 223, 695
See application file for complete search history.

(56) References Cited

U.S. PATENT DOCUMENTS

| 4,025,432 A | * | 5/1977 | Nolan et al. .................. 210/222 |
| 4,170,447 A | * | 10/1979 | Goldstein et al. .......... 423/215.5 |
| 4,217,213 A | * | 8/1980 | Schuster ....................... 210/695 |
| 5,925,168 A | * | 7/1999 | Judkins et al. .................... 95/27 |
| 2002/0056666 A1 | * | 5/2002 | Sharaf ........................... 209/214 |
| 2003/0168385 A1 | | 9/2003 | Papadimitrakopoulos |
| 2007/0000381 A1 | * | 1/2007 | Larouche et al. ................. 95/28 |

FOREIGN PATENT DOCUMENTS

| JP | 2-218412 A | * | 8/1990 |
| JP | 2001-010809 | | 1/2001 |
| JP | 2001-019413 | | 1/2001 |
| JP | 2006-069850 | | 3/2006 |
| JP | 2006-327915 | | 12/2006 |
| KR | 10-2004-0101280 | | 12/2004 |

* cited by examiner

*Primary Examiner* — Richard L Chiesa  
(74) *Attorney, Agent, or Firm* — Harness, Dickey & Pierce, P.L.C.

(57) ABSTRACT

This invention relates to a carbon nanotube producing system. A carbon nanotube producing system includes a reaction tube in which a metal catalyst and a carbon-containing gas are supplied and carbon nanotube grows on the metal catalyst by pyrolysis; an exhaust line along which a gas including the carbon nanotube grown on the metal catalyst is exhausted from the reaction tube; and a carbon nanotube trapping apparatus installed on the exhaust line and configured to trap the carbon nanotube grown on the metal catalyst by using a magnetic force.

20 Claims, 8 Drawing Sheets

APPARATUS FOR TRAPPING CARBON NANOTUBE AND SYSTEM AND METHOD FOR PRODUCING THE CARBON NANOTUBE

CROSS-REFERENCE TO RELATED APPLICATIONS

This U.S. non-provisional patent application claims priority under 35 U.S.C §119 of Korean Patent Application 2006-75678 filed on Aug. 10, 2006, the entirety of which is hereby incorporated by reference.

BACKGROUND

The present invention relates to carbon nanotube producing systems. More specifically, the present invention is directed to a carbon nanotube trapping apparatus and method, and a carbon nanotube producing system and method.

Carbon nanotubes are hollow cylinders of carbon atoms. Their appearance is that of rolled tubes of graphite, such that their walls are hexagonal carbon rings, and they are often formed in large bundles.

With the possession of metallic conductivity and semiconductor conductivity according to structures, carbon nanotubes are now top candidate to be applied to various technological fields such as, for example, electrodes of electrochemical storage devices (e.g., secondary cells or supercapacitors), electromagnetic shielding, field emission displays or gas sensors.

In recent years, methods for producing carbon nanotubes are classified into five to six categories such as laser discharge, laser deposition, and pyrolysis chemical vapor deposition (pyrolysis CVD). Especially, the pyrolysis CVD is being used mainly. In the pyrolysis CVD, carbon nanotubes grow on a metal catalyst while supplying a carbonic gas into a high-temperature reaction tube. The pyrolysis CVD is performed with metal catalyst particles at a temperature ranging from 600 to 1000 degrees centigrade. The carbon nanotubes growing on a metal catalyst produced in a high-temperature reaction tube are collected using a back filter installed on an exhaust line.

However, a carbon nanotube collecting method using a back filter encounters a decreased collection performance because holes of the back filter are clogged. Therefore, the apertures of the back filter should be unclogged periodically using a gas or a vibration plate. Since the back filter cannot be used at a high temperature, a cooling system should be installed at the front end of the back filter to cool an exhausted gas including a carbon nanotube below 200 degrees centigrade.

SUMMARY OF THE INVENTION

Exemplary embodiments of the present invention provide a carbon nanotube trapping apparatus for trapping carbon nanotubes generated at a reaction tube. In an exemplary embodiment, the carbon nanotube trapping apparatus may include: a housing including an inner space through which an exhaust gas including carbon nanotubes growing on a metal catalyst passes; and a magnetic block installed at the housing and configured to trap the carbon nanotubes grown on the metal catalyst by using a magnetic force.

Exemplary embodiments of the present invention provide a carbon nanotube producing system. In an exemplary embodiment, the carbon nanotube producing system may include: a reaction tube in which a metal catalyst and a carbon-containing gas are supplied and carbon nanotube grows on the metal catalyst by pyrolysis; an exhaust line along which a gas including the carbon nanotube grown on the metal catalyst is exhausted from the reaction tube; and a carbon nanotube trapping apparatus installed on the exhaust line and configured to trap the carbon nanotube grown on the metal catalyst by using a magnetic force.

Exemplary embodiments of the present invention provide carbon nanotube trapping methods. In an exemplary embodiment, the carbon nanotube producing method may include: exhausting an exhaust gas including a carbon nanotube grown on the metal catalyst; and trapping the carbon nanotube from the exhaust gas by using a magnetic force.

In another exemplary embodiment, the carbon nanotube producing method may include: supplying a metal catalyst and a carbon-containing gas in a reaction tube, and growing carbon nanotube on the metal catalyst by a pyrolysis; exhausting an exhaust gas including a carbon nanotube grown on the metal catalyst from the reaction tube; and trapping the carbon nanotube from the exhaust gas in a trap portion by using a magnetic force.

DETAILED DESCRIPTION OF PREFERRED EMBODIMENTS

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
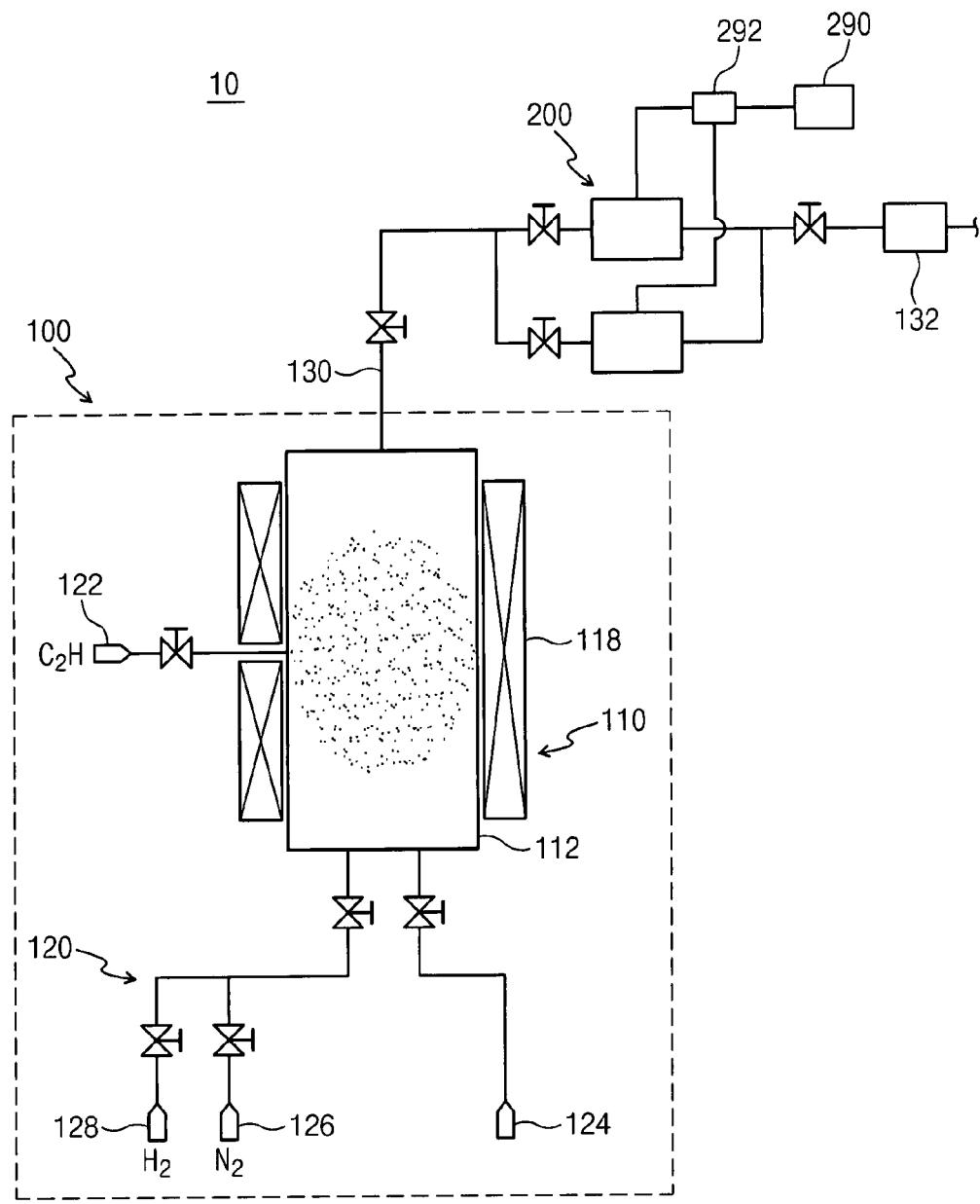
FIG. 1 is a configuration diagram illustrating an example of a carbon nanotube producing system according to the present invention.

An example of a carbon nanotube producing system 10 according to the present invention is illustrated in FIG. 1. The carbon nanotube producing system 10 employs a fluidization method and includes a carbon nanotube producing apparatus 100 and a carbon nanotube trapping apparatus 200.

The carbon nanotube producing apparatus 100 includes a reaction chamber 110, a source supply part 120, and an exhaust line 130. A liquidus or gaseous carbon-containing gas (hereinafter referred to as "carbon source") and a metal catalyst are supplied into the reaction chamber 110. The carbon source is pyrolyzed to successively produce carbon nanotubes under the gas state.

The reaction chamber 110 includes a reaction tube 112 made of a heat-proof material such as quartz or graphite. The reaction tube 112 may be roughly provided with the shape of vertical cylinder. A heating unit 118 is installed outside the reaction tube 112 for heating the reaction tube 112 to a process temperature. The heating unit 118 may be hot coils provided to surround the outer wall of the reaction tube 112. During a process, the reaction tube 112 is maintained at a high temperature ranging from 500 to 5,000 degrees centigrade and a carbon source, a metal catalyst, and a fluid gas are supplied into the reaction tube 112.

An exhaust line 130 is connected to the top end of the reaction tube 112. An exhaust gas including a carbon nanotube growing on the metal catalyst produced in the reaction tube 112 is exhausted through the exhaust line 130. The exhaust gas is provided to the carbon nanotube trapping apparatus 200 through the exhaust line 130. An exhaust unit 132, such as a vacuum pump or an exhaust fan, is installed at the exhaust line 130 for forcibly exhausting the exhaust gas.

The source supply part 120 includes a catalyst supply unit 122, a source gas supply unit 124, and a fluid gas supply unit 126. A carbonic source may be at least one selected from the group consisting of acetylene, ethylene, methane, benzene, xylene, cyclohexane, carbon monoxide, and carbon dioxide. A metal catalyst is an organic metal compound having a magnetic substance such as iron (Fe), cobalt, and nickel. Supplying the metal catalyst may be done by injecting the metal catalyst into the reaction tube 112 or charging the bottom surface of the reaction tube 112 with the metal catalyst. A fluid gas may be an inert gas such as helium, nitrogen, and argon. If necessary, the fluid gas may be a gas such as methane, acetylene, carbon monoxide, and carbon dioxide or a mixed gas of argon and one of the above-mentioned gases.

The fluid gas and the metal catalyst are injected from the bottom of the reaction tube 112. As a carbon nanotube on a metal catalyst grows, the weight of the carbon nanotube weight increases and thus it drops in a gravity direction. The fluid gas prevents the carbon nanotube from dropping in the gravity direction. Since the fluid gas is supplied to form a fluidization area, the reaction of the carbon source and the metal catalyst is activated. Further, the fluid gas is used to carry the carbon nanotube growing on the metal catalyst to the carbon nanotube trapping apparatus 200.

Not only the foregoing gas but also many kinds of auxiliary gases may be needed to produce carbon nanotubes. For example, an auxiliary reaction gas such as hydrogen gas is needed. Accordingly, the source supply part 120 may further include a hydrogen gas supply unit 128 configured to supply hydrogen gas.

As described above, the fluid gas is supplied into the reaction tube 112 at a suitable flow rate to form a fluidization region inside the reaction tube 112. Thus, the reaction of the carbon source and the metal catalyst is activated and the carbon nanotube growing on the metal catalyst produced in the reaction tube 112 are carried to the carbon nanotube trapping apparatus 200 through the exhaust line 130 together with the fluid gas.

Figure 2:
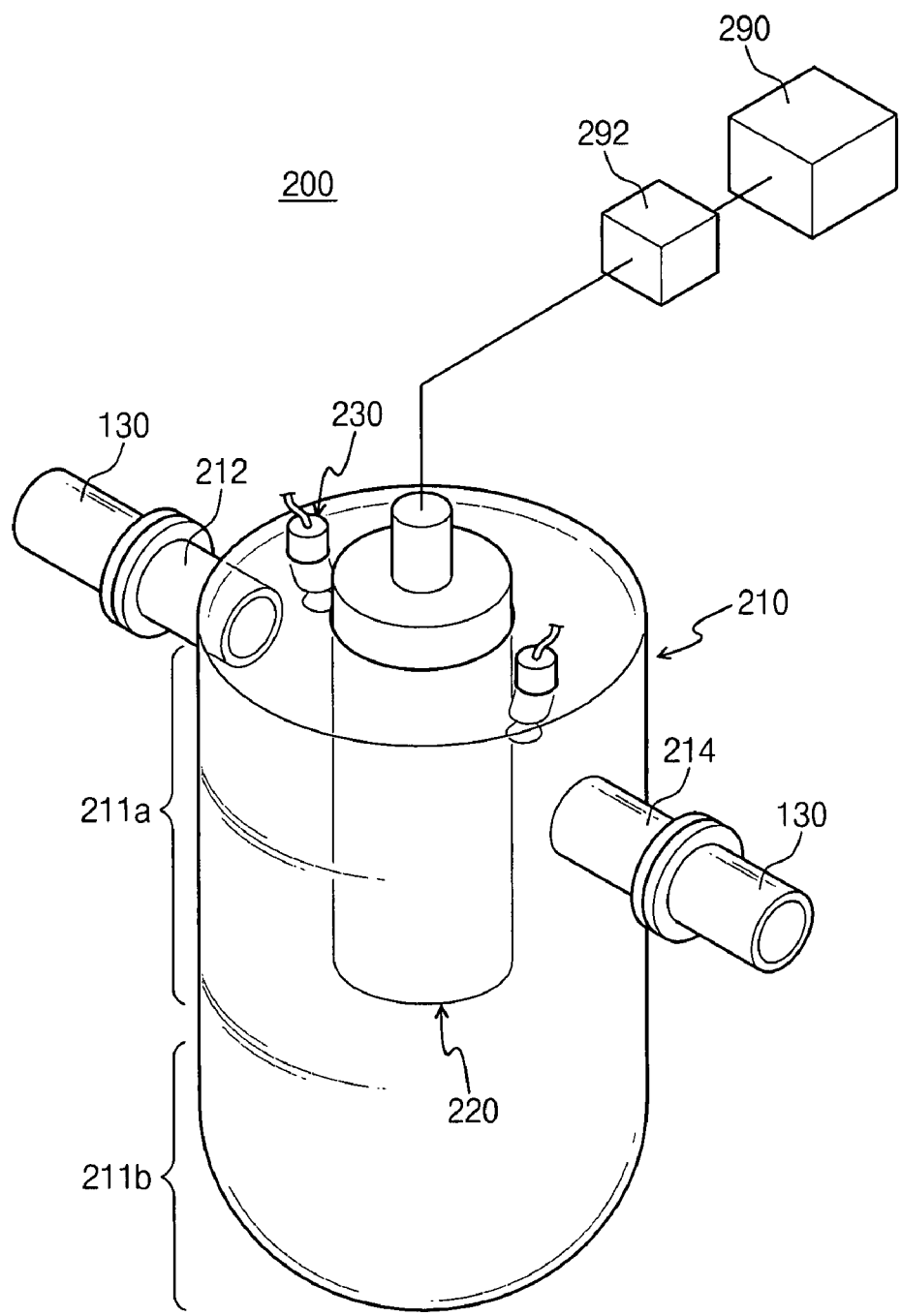
FIG. 2 is a perspective view of a carbon nanotube trapping apparatus.
Figure 3:
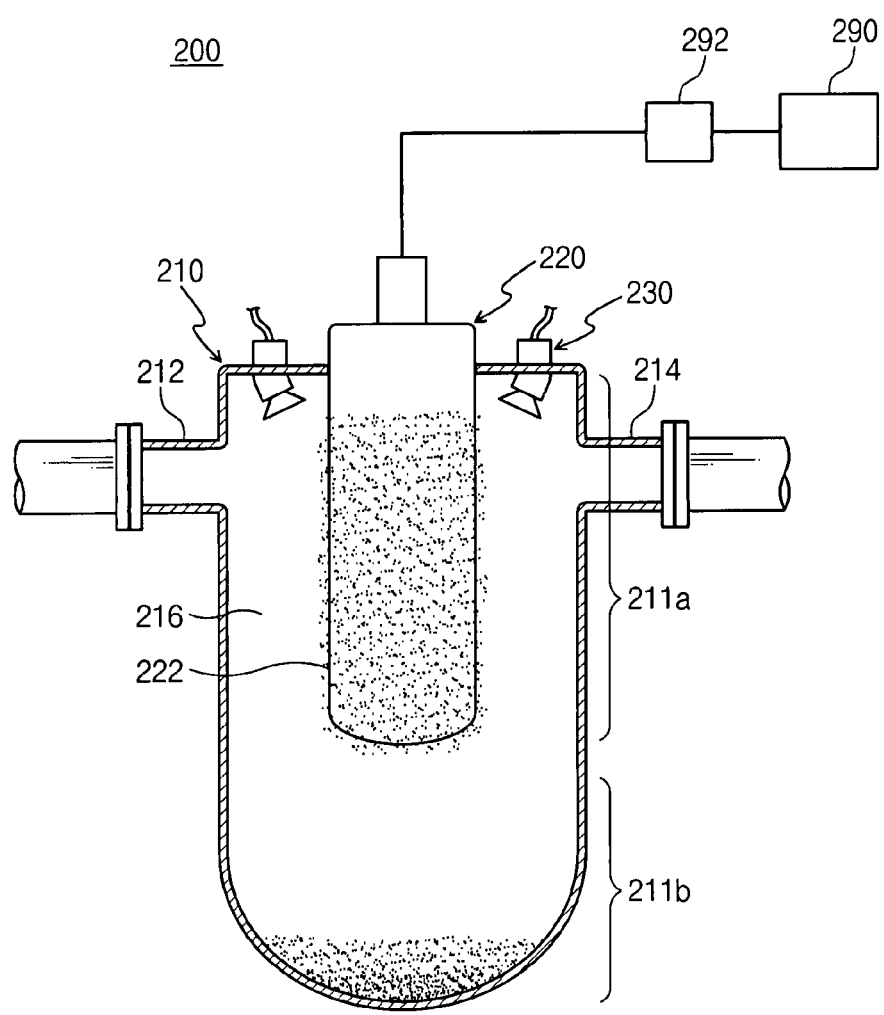
FIG. 3 is a cross-sectional view of the inside of the carbon nanotube trapping apparatus shown in FIG. 2.

FIG. 2 is a perspective view of a carbon nanotube trapping apparatus 200, and FIG. 3 is a cross-sectional view illustrating the inside of the carbon nanotube trapping apparatus 200.

Referring to FIGS. 2 and 3, the carbon nanotube trapping apparatus 200 is installed on an exhaust line 130 and traps carbon nanotubes growing on a metal catalyst from the exhaust gas by using a magnetic force. The carbon nanotube trapping apparatus 200 includes a housing 210, a magnetic block 220, and an injection nozzle 230. A plurality of the carbon nanotube trapping apparatus 200 are installed on the exhaust line 130. the carbon nanotube trapping apparatus 200 may be installed in parrell with each other to trap successively carbon nanotubes growing on a metal catalyst even when they are successively produced in a carbon nanotube producing apparatus 100. Selectively, the carbon nanotube trapping apparatus 200 may be installed in series with each other to increase a trapping efficiency.

The housing 210 includes an inner space 216. An inflow port 212 through which an exhaust gas flows in and an outflow port 214 through which the exhaust gas flows out are connected inner space 216. The magnetic block 220 is disposed at the housing 210. The housing 210 is divided into a trap portion 211a in which carbon nanotubes growing on a metal catalyst are trapped and a collection portion 211b in which the trapped carbon nanotubes are collected and accumulated. Although not shown in the figures, the collection portion 211b may be isolated from the trap portion 211a by an open/close member. That is, the collection portion 211b may be isolated while trapping the carbon nanotube growing on the metal catalyst and opened to collect the temporarily trapped carbon nanotubes. The housing 210 is made of a transparent material to enable an operator to confirm an inner state of the housing 210. Also the housing 210 is made of a non-magnetic material to prevent a magnetic force generated by the magnetic block 220 from being applied to the outside.

Figure 4A:
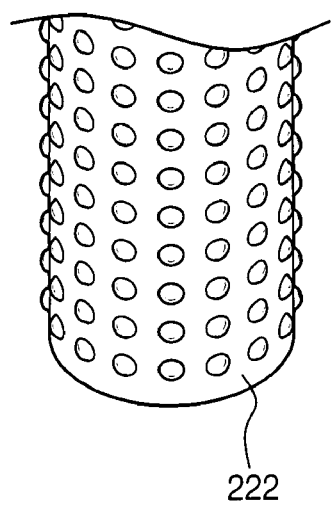
FIGS. 4A and 4B illustrate the circumferential surface of a magnetic block.
Figure 4B:
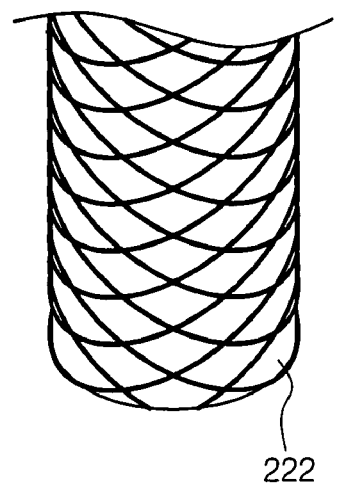

The magnetic block 220 is vertically installed at the trap portion 211a in the housing 210. The magnetic block 220 includes an electromagnet. As illustrated in FIGS. 4A and 4B, a circumferential surface 222 of the magnetic block 220 may be uneven or mesh-shaped to increase adsorption area and adsorptivity of a carbon nanotube growing on a metal catalyst. The carbon nanotube trapping apparatus 200 includes a power part 290 for supplying a power to the electromagnet of the magnetic block 220 and a switch 292 for supplying or cutting off the power to the magnetic block 220.

Trapping and collecting a carbon nanotube growing on a metal catalyst will now be described below.

A carbon nanotube growing on a metal catalyst is inlets into the inner space 216 of the housing 210 together with an exhaust gas. The carbon nanotube in the inner space 216 comes in contact with the magnetic block 220 that is vertically installed at the center of the inner space 216, and the metal catalyst is attached to the circumferential surface 222 of the magnetic block 220 by the magnetic force. That is, the carbon nanotube growing on the metal catalyst is trapped to the circumferential surface 222 of the magnetic block 220 by the magnetic force and only a carbon-nanotube-free exhaust gas is exhausted through the outflow port 214. The larger the amount of carbon nanotube trapped to the magnetic block 220 is, the lower a trapping efficiency is. For this reason, the carbon nanotube trapping apparatus 200 performs periodical collecting steps to enhance trapping efficiency. The power supplied to the magnetic block 220 is temporarily cut off to lose the magnetic force. Thus, the trapped carbon nanotube drops to be accumulated at the collection portion 211b.

The injection nozzle 230 is configured to inject gas such as air into the housing 210 such that the carbon nanotube trapped by the magnetic block 220 is accumulated at the collection portion 211b. The injection nozzle 230 is installed on the housing 210 facing the collection portion 211b, injecting air toward the circumferential surface of the magnetic block 220. The injection nozzle 230 is used while collecting the trapped carbon nanotube to the collection portion 211b. The collection of the carbon nanotube grown on the metal catalyst is done using the injection nozzle while the magnetic force of the magnetic block 220 is lost.

Since carbon nanotubes are successively trapped in two carbon nanotube trapping apparatuses, carbon nanotubes are successively produced in a carbon nanotube producing apparatus. Thus, the mass production of carbon nanotubes may be achieved.

Figure 5:
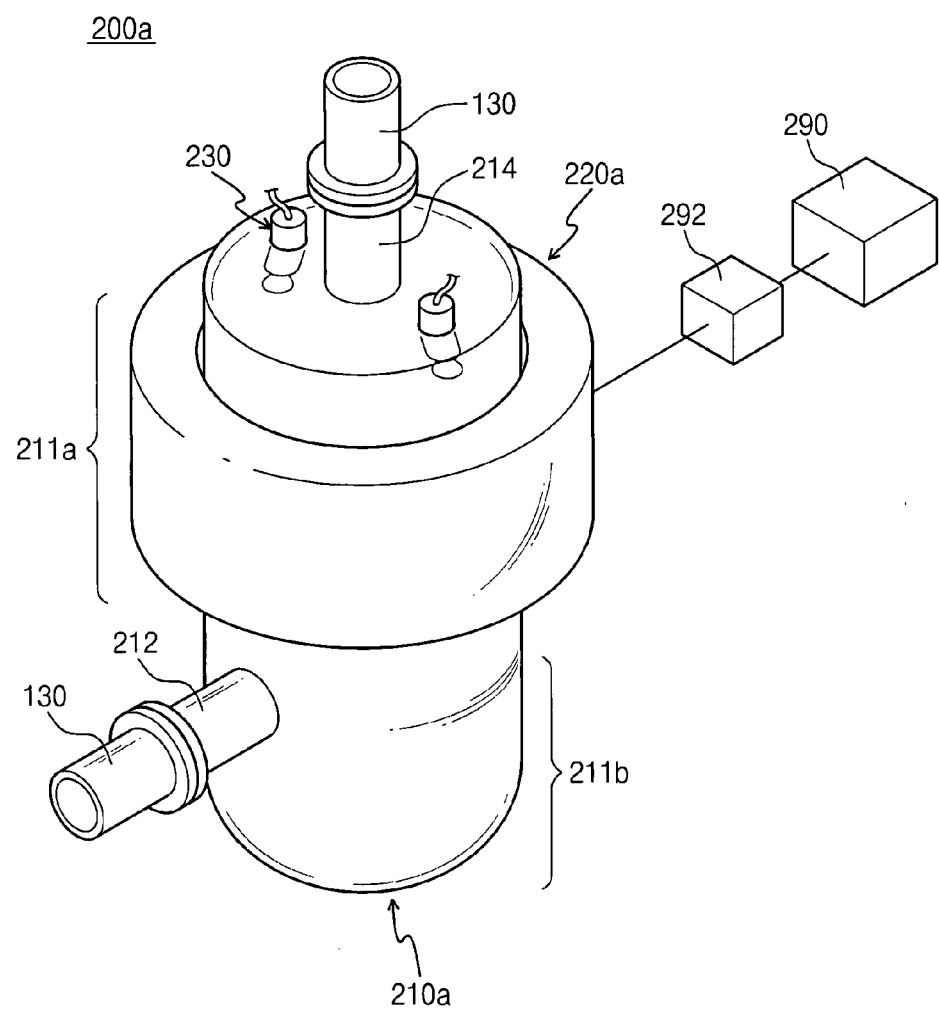
FIGS. 5 and 6 illustrate a carbon nanotube trapping apparatus where a magnetic block is installed outside a housing.
Figure 6:
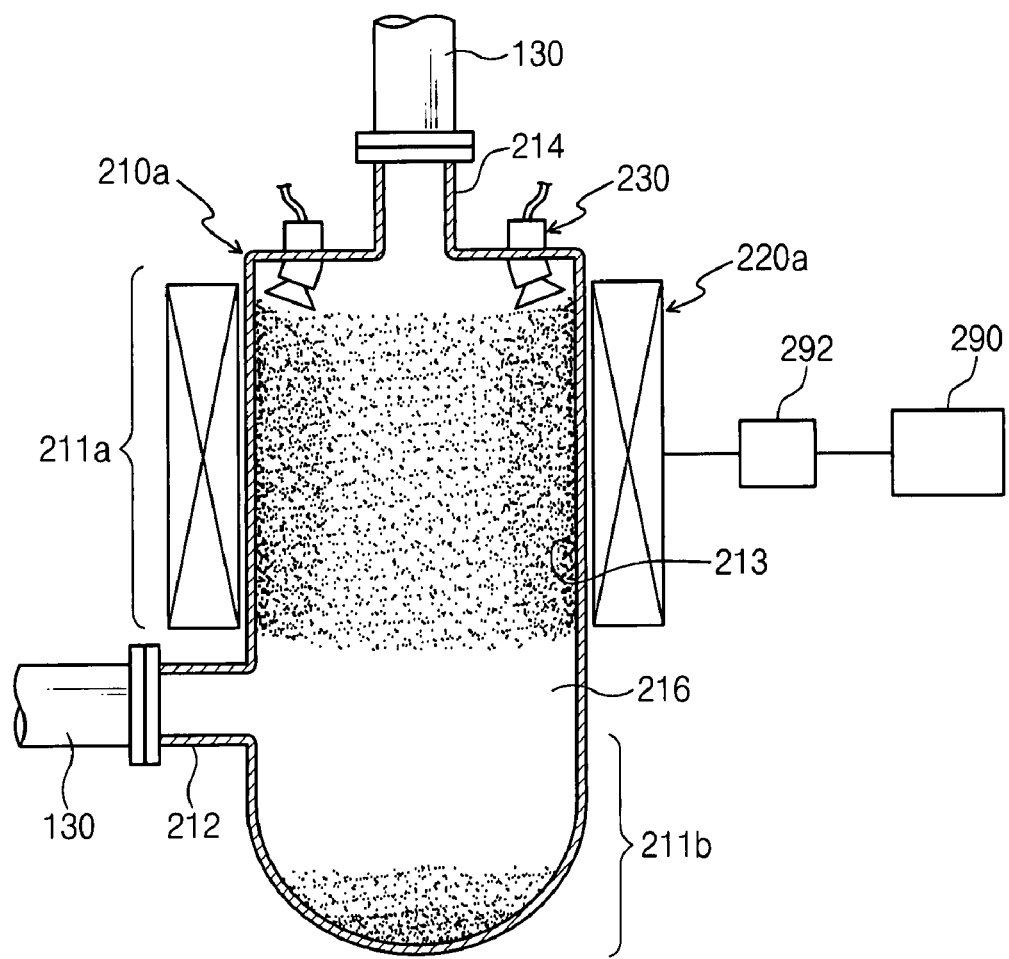

FIGS. 5 and 6 illustrate a carbon nanotube trapping apparatus 200a where a magnetic block is installed outside a housing. The carbon nanotube trapping apparatus 200a is installed on an exhaust line 130. The carbon nanotube trapping apparatus 200a includes a housing 210a, a magnetic block 220a, and an injection nozzle 230.

The housing 210a includes an inner space 216. An inflow port 212 and an outflow port 214 are connected with the inner space 216. The housing 210a may be divided into a trap portion 211a in which carbon nanotubes growing on a metal catalyst are trapped and a collection portion 211b in which the trapped carbon nanotubes are collected and accumulated. The magnetic block 220a is installed at an outer circumferential surface of the trap portion 211a. The housing 210 has a confirm window for enabling an operator to confirm an inner state of the housing 210. Also the housing 210 is made of a non-magnetic material to prevent a magnetic force generated by the magnetic block 220 from being applied to the outside. Although not shown in the figures, an inner circumferential surface 222 of the magnetic block 220 may be uneven or mesh-shaped to increase adsorption area and adsorptivity of a carbon nanotube growing on a metal catalyst.

The magnetic block 220a is disposed to surround the trap portion 211a. The magnetic block 220a includes an electromagnet. The carbon nanotube trapping apparatus 200a includes a power part 290 for supplying a power to the electromagnet of the magnetic block 220a and a switch 292 for supplying or cutting off the power to the electromagnet.

Trapping and collecting a carbon nanotube are performed as described above.

A carbon nanotube growing on a metal catalyst inlets into the inner space 216 of the housing 210 together with an exhaust gas. The carbon nanotube in the inner space 216 comes in contact with an inner side surface 213 defining the trap portion 211a of the housing 210a, and the inner side surface 213 get magnetism generated by the magnetic force of the magnetic block 220a. Thus, the metal catalyst being a magnetic substance is attached to the inner side surface 213 of the trap portion 211a. That is, the carbon nanotube grown on the metal catalyst is trapped to the inner side surface 213 by the magnetic force and only a carbon-nanotube-free exhaust gas is exhausted through the outflow port 214. The carbon nanotube trapped to the inner side surface 213 is accumulated through a collecting step.

The injection nozzle 230 is configured to inject air into the housing 210 such that the carbon nanotube trapped to the inner side surface 213 of the housing 210a is accumulated at the collection portion 211b. The injection nozzle 230 is installed on the housing 210a facing the collection portion 211b, injecting air toward the inner circumferential surface of the housing 210a.

Figure 7:
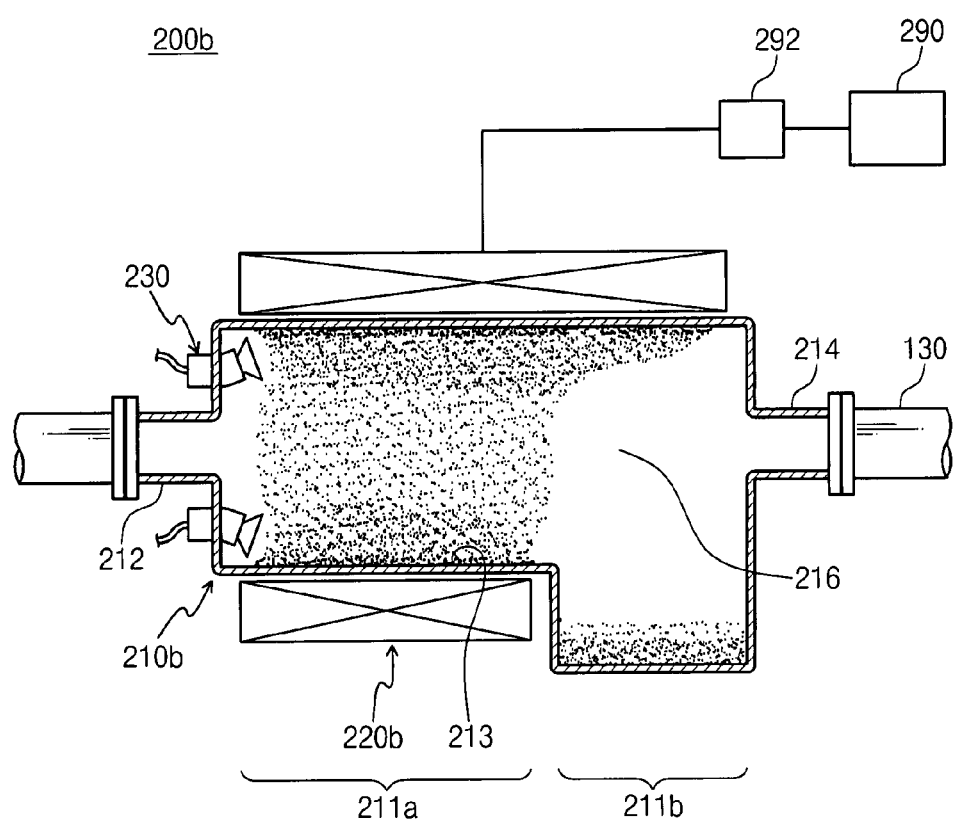
FIG. 7 illustrates another example of a carbon nanotube trapping apparatus where a magnetic block is installed outside a housing.

FIG. 7 illustrates another example of a carbon nanotube trapping apparatus 200b where a magnetic block is installed outside a housing. The carbon nanotube trapping apparatus 200b includes a housing 210a having a path along which an exhaust gas passes, magnetic blocks 220a installed at the upper end and the lower end of the housing 210a respectively, and an injection nozzle 230 installed at the one side of the housing 210a for injecting air in a flow direction of the exhaust gas.

The housing 210a includes an inner space 216. An inflow port 212 and an outflow port 214 are connected with the inner space 216. A magnetic block 220b is disposed at the housing 210a. The housing 210a may be divided into a trap portion 211a in which carbon nanotubes growing on a metal catalyst are trapped and a collection portion 211b, disposed at the back end of the trap portion 211a, in which the trapped carbon nanotubes are collected and accumulated. The collection portion 211b is disposed lower than the trap portion 211a, preventing a carbon nanotube accumulated at the collection portion 211b from flowing back to the trap portion 211a. In order to enable the magnetic force of the magnetic block 220b to reach the inner space 216, the inner space 216 should be wide sufficiently. This is to enhance trapping efficiency. The magnetic blocks 220a installed at the upper and the lower ends of the housing 210a correspond to each other. If the carbon nanotube trapping apparatus 200b is capable of trapping a carbon nanotube grown on a metal catalyst only by using magnetic force of an electromagnet, it may be provided with various shapes. Although not shown in the figures, a brush member may be installed at the carbon nanotube trapping apparatus 200b for brushing carbon nanotubes dropping on the bottom of the housing 210b and accumulating the brushed carbon nanotubes at the collection portion 211b.

A carbon nanotube producing method using a carbon nanotube producing apparatus according to the present invention will now be described below in detail.

Figure 8:
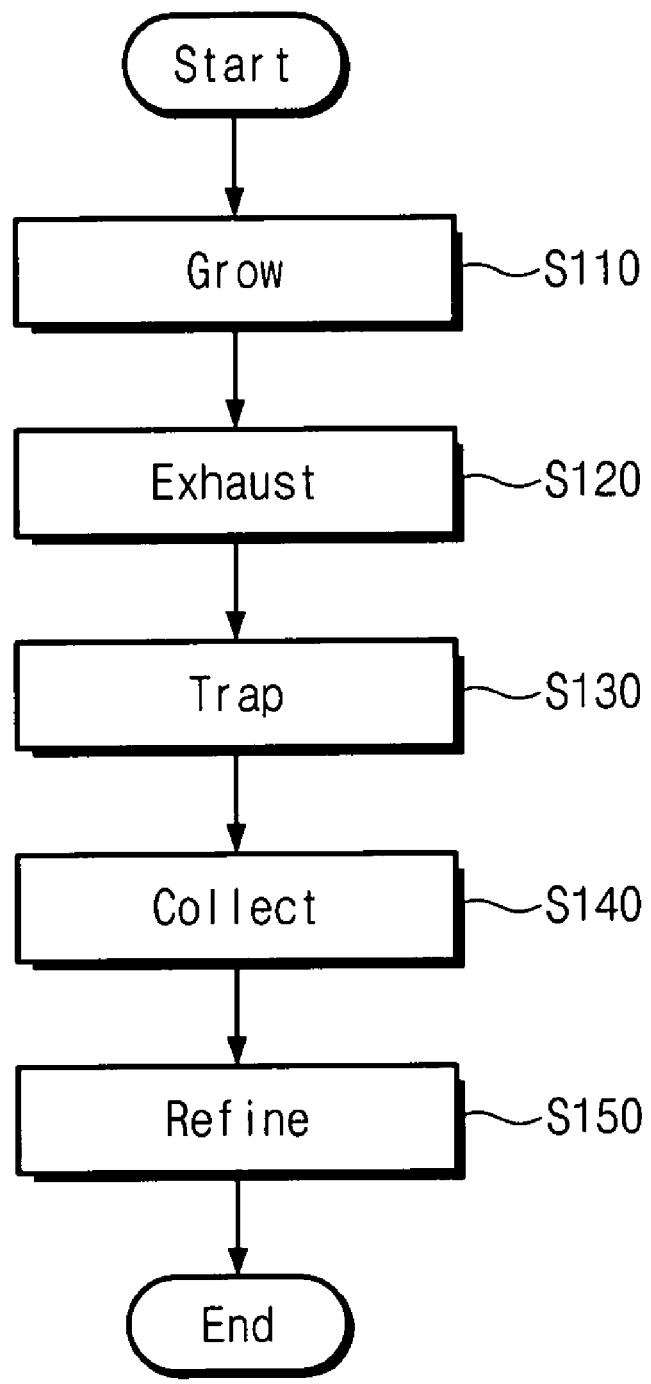
FIG. 8 is a flowchart of a carbon nanotube producing system.

Referring to FIGS. 1 and 8, the carbon nanotube producing method includes a growing step S110, an exhausting step S120, a trapping step S130, and a refining step S1520.

In the growing step S110, a metal catalyst and a source gas are supplied to the reaction tube and carbon nanotube grows on metal catalyst by pyrolysis. In the exhausting step S120, an exhaust gas including the carbon nanotube produced in the reaction tube 212 is exhausted along an exhaust line 230. In the trapping step S130, the carbon nanotube is trapped, using a magnetic force, in a carbon nanotube trapping apparatus 200 installed at a path along which the exhaust gas is exhausted. In the collecting step S140, the magnetic force is lost to collect the carbon nanotube trapped to a trap portion 211a to a collection portion 211b disposed below the trap portion 211a. In the collecting step S140, air is injected through an injection nozzle 230 to carry the ed carbon nanotube to the collection portion 211b. In the refining step S150, the metal catalyst and contaminants (e.g., amorphous carbon nanotube or the like) are eliminated from the collected carbon nanotube.

A fluid layer reaction chamber using pyrolysis of hydrocarbon (where a carbon source is pyrolyzed to grow carbon nanotubes on a metal catalyst) has been described in an exemplary embodiment of the present invention. However, carbon nanotube producing apparatuses of the system 100 according to the invention may adopt various producing methods such as electric discharge, laser deposition, plasma chemical vapor deposition, thermochemical vapor deposition, electrolysis, and flame composition.

According to the present invention, mass production of carbon nanotubes is achieved. Further, carbon nanotubes are successively produced to improve an operating rate of the system. Since a cooling system for trapping carbon nanotubes is not needed, a size of the system is reduced. In addition, trapping rate of carbon nanotubes is improved.

Although the present invention has been described in connection with the embodiment of the present invention illustrated in the accompanying drawings, it is not limited thereto. It will be apparent to those skilled in the art that various substitutions, modifications and changes may be made without departing from the scope and spirit of the invention.

What is claimed is:

1. A carbon nanotube trapping apparatus for trapping carbon nanotubes generated at a reaction tube, comprising:

a housing including an inner space through which an exhaust gas including carbon nanotubes grown on a metal catalyst passes, the housing having an inner circumferential surface of non-magnetized material; and a magnetic block installed at the housing and configured to trap the carbon nanotubes grown on the metal catalyst on the inner surface of the housing by using a magnetic force.

2. The carbon nanotube trapping apparatus of claim 1, wherein the magnetic block includes an electromagnet.

3. The carbon nanotube trapping apparatus of claim 1, further comprising:

a collection portion configured to collect the carbon nanotube trapped by the magnetic block.

4. The carbon nanotube trapping apparatus of claim 3, further comprising:

an injection nozzle configured to inject gas into the housing such that the trapped carbon nanotubes are accumulated at the collection portion.

5. The carbon nanotube trapping apparatus of claim 1, wherein the housing is a cylindrical shape with a closed top and bottom, and the magnetic block surrounds an outer circumferential surface of the housing.

6. The carbon nanotube trapping apparatus of claim 1, wherein the magnetic block is a ring shape.

7. A carbon nanotube producing system comprising:

a reaction tube in which a metal catalyst and a carbon-containing gas are supplied and carbon nanotube grows on the metal catalyst by pyrolysis;

an exhaust line along which a gas including the carbon nanotube grown on the metal catalyst is exhausted from the reaction tube; and a carbon nanotube trapping apparatus installed on the exhaust line, the carbon nanotube trapping apparatus having a housing with an inner circumferential surface of non-magnetized material, a magnetic block installed at the housing and being configured to trap the carbon nanotube grown on the metal catalyst on the inner circumferential surface of the housing by using a magnetic force.

8. The carbon nanotube producing system of claim 7, wherein the magnetic block surrounds the housing, wherein the magnetic block has an electromagnet, wherein the housing has an inner space, wherein an inflow port through which the exhaust gas flows in and an outflow port through which the exhaust gas flows out are connected to the inner space.

9. The carbon nanotube producing system of claim 8, wherein the carbon nanotube trapping apparatus further comprises:

an injection nozzle configured to inject gas into the housing such that the carbon nanotube trapped to the inner circumferential surface of the housing drops.

10. The carbon nanotube producing system of 8, wherein the housing includes a collection portion configured to accommodate the carbon nanotube trapped by the electromagnet when the trapped carbon nanotube drops due to loss of the magnetic force of the electromagnet.

11. The carbon nanotube producing system of claim 10, further comprising:

an injection nozzle configured to inject air into the housing such that the carbon nanotube trapped by the electromagnet is accumulated at the collection portion when the magnetic force of the electromagnet is lost.

12. The carbon nanotube producing system of claim 8, wherein two carbon nanotube trapping apparatuses are installed at the exhaust line in series or in parallel.

13. A carbon nanotube trapping method comprising:

exhausting an exhaust gas including a carbon nanotube grown on a metal catalyst;

passing the exhaust gas through a housing having a magnetic block; and trapping the carbon nanotube from the exhaust gas on a non-magnetized inner circumferential surface of the housing by using a magnetic force.

14. A carbon nanotube trapping method of claim 13, further comprising:

losing a magnetic force of the trap portion to drop the trapped carbon nanotube to a collection portion.

15. A carbon nanotube producing method comprising:

supplying a metal catalyst and a carbon-containing gas in a reaction tube, and growing carbon nanotube on the metal catalyst by a pyrolysis, exhausting an exhaust gas including a carbon nanotube grown on the metal catalyst from the reaction tube;

passing the exhaust gas through a housing having a magnetic block; and trapping the carbon nanotube from the exhaust gas on a non-magnetized inner circumferential surface of the housing in a trap portion by using a magnetic force.

16. The carbon nanotube producing method of claim 15, further comprising a collecting step in which the carbon nanotube trapped in the trap portion is collected to a collection portion, wherein the collecting step comprises losing a magnetic force of the trap portion to drop the trapped carbon nanotube to the collection portion.

17. The carbon nanotube producing method of claim 15, further comprising a collecting step in which the carbon nanotube trapped in the trap portion is collected to a collection portion, wherein the collecting step comprises injecting air to carry the carbon nanotube to the collection portion from the trap portion.

18. The carbon nanotube producing method of claim 15, wherein the magnetic force is provided by an electromagnet.

19. The carbon nanotube producing method of claim 18, wherein the magnetic force of the trap portion is periodically turned off to enhance trapping efficiency and collect the carbon nanotube grown on the metal catalyst.

20. The carbon nanotube producing method of claim 16, further comprising:

eliminating the metal catalyst from the carbon nanotube collected to the collection portion.

* * * * *